B. E. BEERS.
LOCK FOR STEERING WHEELS OF VEHICLES.
APPLICATION FILED APR. 23, 1917.

1,250,127. Patented Dec. 18, 1917.

Inventor
Bradford E. Beers

By C. D. Hutchins
Attorney

UNITED STATES PATENT OFFICE.

BRADFORD E. BEERS, OF SPOKANE, WASHINGTON, ASSIGNOR OF ONE-FOURTH TO
M. E. DAVIDSON, OF SEATTLE, WASHINGTON.

LOCK FOR STEERING-WHEELS OF VEHICLES.

1,250,127.   Specification of Letters Patent.   Patented Dec. 18, 1917.

Application filed April 23, 1917.   Serial No. 164,072.

*To all whom it may concern:*

Be it known that I, BRADFORD E. BEERS, a citizen of the United States, residing at Spokane, in the county of Spokane and State of Washington, have invented a certain new and useful Improvement in Locks for Steering-Wheels of Vehicles, of which the following is a specification.

My invention relates to improvements in locks for steering wheels of vehicles, and the object of my invention is to provide locking mechanism in association with the steering wheel and steering shaft of an automobile, which locking mechanism shall be adapted to be actuated to dispose and securely lock one of its movable parts at different desired times in the required one of two different positions with respect to other of its parts, in one of which positions said steering wheel shall be rigidly fastened on said shaft in fixed relation thereto, and in the other of which position said steering wheel shall be free to be rotated on said shaft without revolving said shaft, whereby one may leave his automobile in such condition that an unauthorized person cannot operatively revolve its steering rod to steer it, or, one quickly may change such condition operatively to cause its said steering rod to revolve in a normal manner in response to rotative movements of said steering wheel, thereby to make it possible to prevent the theft or an unauthorized use of his automobile.

I accomplish this object by devices illustrated in the accompanying drawings, wherein—

Figure 1:
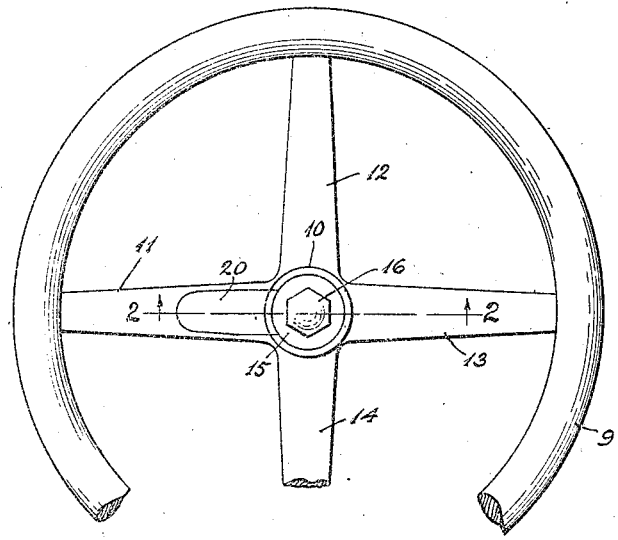
Figure 1 is a plan view of a steering wheel embodying my invention, as it appears in its operative position on the top end of a steering shaft.

Referring to the drawings, throughout which like reference numerals indicate like parts, rigidly fastened to the upper end portion of a steering shaft 5 is a sleeve 6 which is provided with an integral annular flange 7 that surrounds its lower end portion, the upper end portion of said sleeve 6 being of smaller diameter to form an annular shoulder 8.

Figure 2:
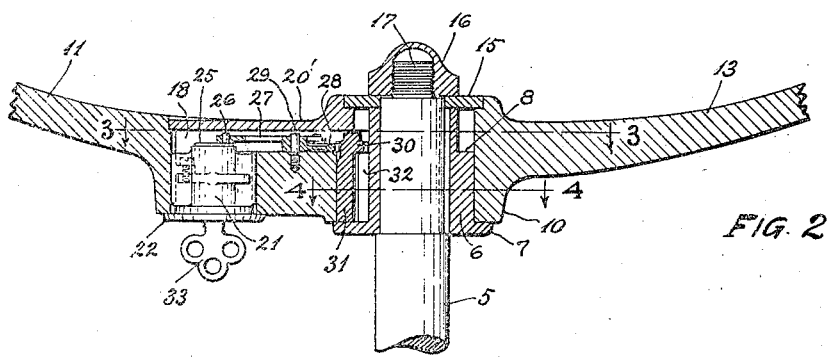
Fig. 2 is an enlarged fragmentary view of the same in vertical section on broken line 2, 2 of Fig. 1, showing the top end portion of the steering shaft in side elevation.

Rotatably mounted on said sleeve 6 is a steering wheel 9, the bottom surface of whose hub 10 is disposed in engagement with the top surface of the annular flange 7 as shown more clearly in Fig. 2.

The steering wheel 9 embodies integral spokes 11, 12, 13 and 14 which radiate from its hub 10, and the hole through said hub 10 is counter-bored at its upper end and within such counter-bored portion is rotatably disposed an annular washer 15 whose under side is held in rigid engagement with the top end surface of the sleeve 6 by means of a hexagonal cap-nut 16 which is permanently screwed fast on a screw-threaded projecting portion 17 of the steering shaft 5, which washer 15 and nut 16 coact rigidly to fasten said sleeve 6 in its fixed position on the steering shaft 5 without preventing rotative movements of the steering wheel 9 with respect to the sleeve 6.

As shown more clearly in Fig. 2, the spoke 11 is of larger dimensions throughout a portion of its length adjacent to the hub 10 and in its top side is formed a recess 18 which extends from the hole bored through the hub 10 to a point near the outer end of said enlarged portion, the bottom surface of said recess 18 registering with the surface of the shoulder 8 of the sleeve 6.

The side walls of said recess 18 are provided with a shoulder 19 which serves to support a removable cover 20 that normally covers said recess, which cover 20 is held in its normally closed position by the washer 15.

Disposed to extend vertically through the spoke 11 from the outer end of the recess 18 to the under side of said spoke 11 is a circular hole within which is inserted the body 21 of a pin lock, which body 21 is provided with a flange 22 on its lower end that engages with the bottom surface of the spoke 11.

The body 21 is secured rigidly in its position by screws 23, which extend through lugs 24, which project from the inner surfaces of the vertical hole within which the body 21 is disposed.

Figure 3:
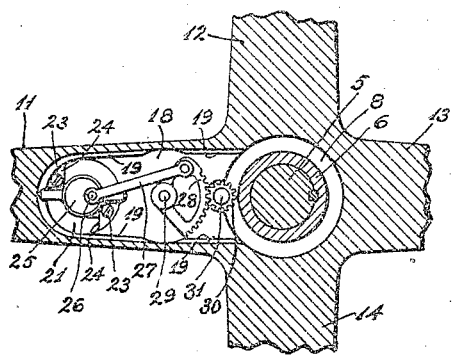
Fig. 3 is a fragmentary view of the same in horizontal section on broken line 3, 3 of Fig. 2.

Extending upwardly from the top end surface of the rotatable cylinder 25, of the pin lock, is an eccentrically disposed stud 26 to which is articulated one end of a connecting rod 27 whose other end is articulated to a sector gear 28 which is pivotally mounted on a stud 29 that projects upwardly from the bottom surface of the recess 18, as shown more clearly in Fig. 3.

Figure 4:
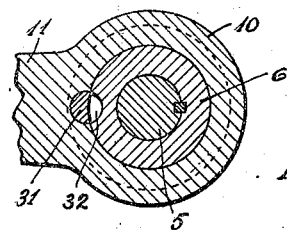
Fig. 4 is a fragmentary view of the same in horizontal section on broken line 4, 4 of Fig. 2.

The teeth of the sector gear 28 are adapted operatively to engage with a pinion 30 which is integral with the upper end of a locking member 31, whose form in cross-section is crescent-like as more clearly shown in Fig. 4, and which is vertically disposed in a semi-circular groove formed in the boring of the hub 10 to extend parallel with the axis thereof.

The periphery of the sleeve 6 is provided with a vertical groove 32 extending upwardly from its flange 7, which groove 32 is of semi-circular form in cross-section, as shown more clearly in Fig. 4, whereby, when the steering wheel 9 is rotatively moved on the sleeve 6 to a circumferential position wherein the groove 32 is opposite the locking member 31, as shown in Fig. 4, then, said locking member 31 may be rotated to project a portion of it into the groove 32 in response to a rotative movement of the cylinder 25 of the pin lock which acts through the connecting rod 27 and sector gear 28 which causes the pinion 30 to rotatively move said locking member 31, thereby rigidly to unite the steering wheel 9 with the sleeve 6 which is rigidly united with the steering shaft 5 so that said steering wheel 9 may be rotated to cause a rotation of said steering shaft 5 in a well known manner to steer the automobile in a desired course.

When it is desired to prevent an unauthorized person from operating the steering shaft 5 it is only necessary to insert the key 33 in the pin lock and then turn it to actuate the cylinder 25 to cause the locking member 31 to be disposed in its position shown in Fig. 4 and thereupon remove the key 33 from the lock, thus leaving the steering wheel 9 and steering shaft 5 in such condition that a rotation of the steering wheel 9 can in no way actuate or revolve the steering shaft 5.

Obviously, changes may be made in the forms, dimensions and arrangement of parts of my invention without departing from the spirit thereof.

What I claim is:

The combination with the steering shaft of a vehicle, of a sleeve securely fastened on the upper end portion of said steering shaft, said sleeve being provided with an annular flange on its lower end and having a groove of semi-circular cross-section disposed on its periphery to extend upwardly from said flange; a spoked steering wheel rotatably mounted on said sleeve with the bottom surface of its hub resting on the upper annular surface of said flange, one of the spokes of said wheel being provided with a recess which extends into the bore of said hub; a groove of semi-circular cross-section provided in the bore of said hub and disposed to extend from the bottom surface of said recess to the bottom end of said hub in parallel with the axis of said hub; a locking member of semi-circular cross-section disposed within the groove of the bore of said hub and provided with a toothed pinion on its upper end portion in a position higher than the bottom of said recess; a sector gear pivotally mounted within said recess in a position operatively to engage its teeth with the teeth of said pinion; a lock disposed to extend from the under side of said spoke into said recess; and a connecting rod operatively disposed to connect a movable part of said lock with said sector gear whereby said pinion may be actuated to rotatively move said locking member to a desired one of two circumferential positions in response to rotative movements of the key of said lock.

In witness whereof, I hereunto subscribe my name this 12th day of April A. D. 1917.

BRADFORD E. BEERS.